Patented Nov. 11, 1952

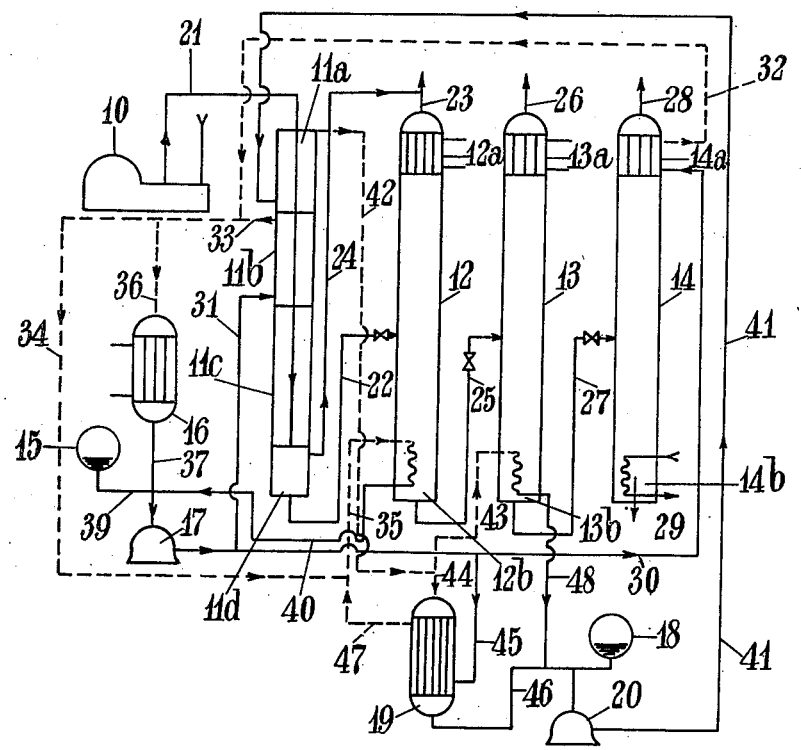

2,617,272

UNITED STATES PATENT OFFICE 2,617,272

SEPARATION OF GASES AT LOW TEMPERATURE

Alfred August Aicher, London, England, assignor to Petrocarbon Limited, London, England Application May 26, 1950, Serial No. 164,540
In Great Britain December 3, 1946

17 Claims. (Cl. 62—122)

The invention of this application, which is a continuation-in-part of application Serial No. 789,174, filed on December 2, 1947 (now abandoned), relates to the separation of mixed gases by cooling followed by fractionation at low temperatures.

In known processes for separating mixed gases by cooling followed by fractionation at low temperatures, the mixed gases are cooled in one or more heat exchangers and then fractionated in a number of fractionating towers connected in series. Liquefaction at least in part is normally effected in the heat exchangers and the liquid so formed is then fed to the fractionating towers to separate it into its components or simpler mixtures thereof. The mixed gases may, however, be cooled without liquefaction and the cooled gaseous mixture then fed to the fractionating towers in which it becomes partially liquefied and separated into its components or simpler mixtures.

The fractionating towers are operated at successively lower relative pressures and higher relative temperatures, usually with the separation of gaseous fractions at the tops of the towers and liquid fractions at the bottoms thereof, the liquid fraction in each case being passed into the next succeeding tower in the series.

The processes comprise a number of cooling operations for cooling the gases and for providing reflux at the tops of the fractionating towers and a number of heating operations carried out in the bottoms of the towers.

For reasons of economy in heat and power it is usual, when the temperature conditions permit, to combine the introduction of heat in a heating operation with the withdrawal of heat in a cooling operation. Such a combination of operations may take place, for example, by the simultaneous condensation of one substance and evaporation of another substance in a single unit generally known as a condenser-evaporator.

In some cases, this combination of operations presents little or no technical difficulty, especially when the two operations would in any case be conducted in adjacent parts of the plant. However, it frequently occurs, especially in plant for the separation of complex gas mixtures and consisting of necessity of a large number of units, that the combination of these units in such a manner that the withdrawal of heat in one operation leads to the direct introduction of heat in another operation is difficult to achieve satisfactorily. Thus such difficulty may occur when the two operations are carried out in units which are not normally adjacent to each other or when the quantity of heat to be withdrawn in the one operation differs markedly from the quantity of heat to be introduced in the other operation.

It is the main object of the present invention to provide a process and plant which overcomes the aforesaid difficulty.

The invention consists in a process for the separation of mixed gases by cooling followed by fractionation at low temperatures and comprising a number of cooling operations and a number of heating operations, in which process at least part of the heat withdrawn in a cooling operation is transferred for use in a heating operation by means of a circulating heat carrier which is evaporated in withdrawing heat during the said cooling operation and at least part of the vapour so produced is condensed in introducing heat during said heating operation, the heat carrier being circulated in a closed circuit by a pump which deals with the carrier in the liquid state only.

The invention also consists in a process in accordance with the preceding paragraph, in which part of the carrier vapour produced by said evaporation is condensed in indirect contact with a refrigerating medium so as to balance the heat requirements of the system.

The invention also consists in apparatus for the separation of mixed gases at low temperatures comprising a number of heat exchangers and a number of fractionating towers connected in series and a closed heat carrier circuit associated therewith in which a heat carrier is circulated by a pump dealing with the carrier in the liquid state only and which circuit serves to withdraw heat in one part of the gas separation apparatus by evaporation of carrier in the liquid state and to introduce heat in another part by condensation of carrier in the vapour state.

The invention also consists in apparatus in accordance with the preceding paragraph, in which the carrier circuit is linked thermally with a refrigerating machine in such a way that any excess in the amount of heat required to be withdrawn over the amount of heat required to be introduced by means of the said carrier circuit is made up by cold produced by the refrigerating machine and transferred to the carrier.

The invention also consists in processes and apparatus in which two heat carrier circuits are employed, each carrier circuit serving to transfer at least part of the heat withdrawn in a cooling operation for use in a heating operation in the manner set out in the preceding paragraphs.

The two circuits may be linked thermally so that the heat requirements of one circuit are balanced by the condensation of part of its carrier in the vapour state in indirect contact with part of the other carrier in the liquid state evaporating.

The invention also consists in processes and apparatus for the separation of mixed gases at low temperatures substantially as herein described.

The accompanying diagrammatic drawing illustrates processes and apparatus for carrying out the invention.

In carrying the invention into effect as illustrated by way of example, the process of separating a gaseous mixture consists in first cooling and partially condensing the mixture in a system of heat exchangers and subsequently fractionating the partial condensed mixture in a series of fractionating towers. Such a process would for instance be conveniently applied to the separation of a mixture of hydrogen and light hydrocarbons and is described below as applied to the separation of a mixture of gases having the following composition:

|  | Percent by volume |
|---|---|
| Hydrogen | 10 |
| Methane | 45 |
| Ethylene | 20 |
| Ethane | 10 |
| Propylene | 8 |
| Propane | 2 |
| Higher boiling hydrocarbons | 5 |
|  | 100 |

The apparatus illustrated comprises a compressor 10, a series of heat exchangers 11a, 11b, 11c, and three fractionating columns 12, 13 and 14 which contain reflux condensers 12a, 13a, and 14a respectively and reboilers 12b, 13b, and 14b respectively. Two carrier circuits each using propylene as the carrier medium are provided, the one including storage vessel 15, condenser 16 and pump 17 and the other storage vessel 18, condenser 19 and pump 20. The apparatus is described in greater detail in the following description of its operation in the separation of the mixture of gases referred to above.

The mixture of gases at a pressure of 8 atms. absolute passes from the compressor 10 through a pipe 21 and into the series of heat exchangers 11a, 11b and 11c in which it is successively cooled to approximately 5° C., −30° C. and −110° C. respectively and partially condensed.

The condensate is separated from the gas in separating vessel 11d and is passed through pipe 22 into the fractionating column 12 from which a gas consisting mainly of methane is withdrawn as overhead through pipe 23 where it is joined by gases from vessel 11d consisting mainly of hydrogen and methane passing through pipe 24.

The liquid product from the bottom of column 12 is passed through pipe 25 into column 13 in which it is split up into a gaseous overhead product consisting mainly of ethylene and ethane which passes off through pipe 26, and a liquid product which is passed through pipe 27 into column 14. In column 14 the gaseous overhead product consisting mainly of proplyene and propane is taken off through pipe 28 and the residual higher boiling hydrocarbons forming the bottom liquid product are removed through pipe 29.

Column 12 is operated at a pressure of 6 atms. absolute and with temperatures of about −140° C. at the top and −55° C. at the bottom. Column 13 is operated at a pressure of 4 atms. absolute and with temperatures of about −68° C. at the top and −6.5° C. at the bottom. Column 14 is operated at a pressure of 2.5 atms. absolute and with temperatures of about −25° C. at the top and 21° C. at the bottom.

The cold needed for the cooling in heat exchanger 11c is provided by evaporating liquid methane from a refrigerating cycle (not shown) and that needed for the cooling in the reflux condenser 12a of column 12 is provided by evaporating liquid methane from another refrigerating cycle (also not shown in the drawing). The cold needed for the reflux condenser 13a of column 13 is provided by evaporating liquid ethylene from another refrigerating cycle. The reboiler 14b at the bottom of column 14 is heated with steam.

The cold required for the reflux condenser 14a of column 14 and to cool and condense the mixture in heat exchangers 11a and 11b and the heat required for the reboilers 12b and 13b of columns 12 and 13, are provided by means of two carrier circuits as described below.

In the one carrier circuit liquid propylene at a pressure of approximately 1.8 atms. absolute is delivered by the pump 17 from storage vessel 15 through pipe 30 to the reflux condenser 14a at the top of column 14, where it is evaporated, the latent heat of vaporisation being provided by the condensing mixture of propylene and propane forming the reflux of this column.

A further portion of liquid propylene at the temperature and pressure mentioned above is delivered through pipe 31 to the heat exchanger 11b where it is evaporated in cooling the mixture passing through the exchanger.

The gaseous propylene leaving reflux condenser 14a through pipe 32 and heat exchanger 11b through pipe 33 is partly passed through pipes 34 and 35 to the reboiler 12b of column 12 where it is condensed, the latent heat of condensation serving to boil the liquid mixture at the bottom of this column.

The remaining part of gaseous propylene coming through pipes 32 and 33 is passed through pipe 36 into condenser-evaporator 16 in which it is liquefied, the latent heat being given up to liquid amonia evaporating at −50° C. supplied from a refrigerating cycle not shown in the drawing.

The liquid condensate formed in condenser-evaporator 16 is returned through pipe 37 to the pump 17 for further circulation. Similarly, the liquid propylene from reboiler 12b is returned through pipe 40 to the pump 17.

As a result of mechanical resistances in the pipe lines and valves of the carrier circuit the pressure of the liquid propylene evaporating in the reflux condenser 14a at the top of column 14 and in the heat exchanger 11b, is slightly higher than that of the gaseous propylene condensing in the reboiler 12b of column 12 and in the condenser-evaporator 16. The pressure and temperature of the evaporating propylene are approximately 1.8 atms. absolute and −33° C., while the temperature and pressure of the condensing propylene are approximately 1.3 atms. absolute and −42° C. As the temperatures of the liquid fractions boiling in thermal contact with the condensing propylene are −55° C. in reboiler 12b and −50° C. in condenser-evaporator 16 and as the temperatures of the gases condensing in thermal contact with evaporating propylene are −30° C. in heat exchanger 11b and −25° C. in reflux condenser 14a, the necessary temperature conditions exist for the carrier circuit to operate.

In the second carrier circuit, liquid propylene at a pressure of approximately 6 atms. absolute is delivered by pump 20 from the storage tank 18 through pipe 41 to the heat exchanger 11a where it is evaporated in cooling the mixture of gases passing through the exchanger.

A part of the gaseous propylene leaving heat exchanger 11a through pipe 42 passes through pipe 43 to the reboiler 13b and is there condensed causing the liquid mixture at the bottom of column 13 to boil. A further part of the gaseous propylene passing through pipe 42 is passed through pipe 44 into a condenser-evaporator 19 where it is liquefied by means of evaporating propylene from the other carrier circuit, taken off from pipe 30 through pipe 45.

The condensed propylene from condenser-evaporator 19 is returned to the pump 20 through pipe 46 for further circulation.

In the second carrier circuit as in the first the pressure of the liquid propylene evaporating in the heat exchanger 11a will be slightly higher than that of the propylene condensing in the reboiler 13b. The pressure and temperature of the evaporating propylene in the second carrier circuit are approximately 6 atms. absolute and 2° C. and the pressure and temperature of the condensing propylene are approximately 5.7 atms. and −2° C. The temperatures of the liquid fractions boiling in thermal contact with the condensing propylene are −6.5° C. in reboiler 13b and −33° C. in condenser-exaporator 19 and the temperature to which the mixed gases are cooled in thermal contact with evaporating propylene is 5° C. in heat exchanger 11a. Thus the conditions are suitable for the operation of the second carrier circuit.

The gaseous propylene of the first circuit leaves the condenser-evaporator 19 through pipe 47 and joins with the stream of gaseous propylene in pipe 35 passing to the reboiler 12b.

The condensed propylene of the second carrier circuit from reboiler 13b passes back through pipe 48 to the pump 20.

The balance of cold required for the two carrier circuits is made up in the condenser-evaporator 16 by the evaporation of liquid ammonia supplied from a refrigerating machine.

Though two carrier circuits linked thermally with each other have been described and illustrated, in accordance with the invention either carrier circuit may be used by itself or both may be used without thermal linking. In each case the heat carrier itself consists of a pure substance, but as explained above there are slight variations of temperature and pressure within each circuit due to mechanical resistances. These variations do not interfere with the operation of the carrier circuits and produce no significant refrigerating effect.

The invention can be used with advantage in a process in which it is desired to separate a complex gaseous mixture into its component parts at low temperatures.

In particular, the invention can be used when the mixture to be separated is a mixture of hydrogen and hydrocarbons. In this case it is useful to employ as carriers substances which are themselves hydrocarbons, such as propane or propylene or ethane or ethylene.

The carrier or carriers used in the carrier circuit or circuits can be any of the known refrigerants or any substance or substances which, under convenient pressures, boil at temperatures suitably in the region of those at which heat is to be withdrawn or introduced.

It is an advantage of the invention that the quantities of heat which may be introduced or withdrawn by the carrier at individual points of the gas separating plant may be very large in comparison with the refrigeration duty that has to be performed by the refrigerating machine on the carrier in the carrier circuit.

It is a further advantage of the invention that any variations in the duties required to be performed at various points of the gas separation plant can be taken up easily by the carrier circuit as a whole by drawing on or adding to the stored carrier and, if necessary, by varying the output of the refrigerating machine.

A further advantage of the invention is that it eliminates the necessity for each input of heat that may be required at a particular point in the gas separating plant to be exactly balanced by a withdrawal of heat at another point of the said plant.

I claim:

1. A process for the separation of mixed gases by cooling followed by fractionation at low temperatures in a number of fractionating towers and comprising a number of cooling operations and a number of heating operations, in which process at least part of the heat withdrawn during one cooling operation is transferred for use in a heating operation by means of a circulating heat carrier which is evaporated in withdrawing heat during the said cooling operation and is condensed in introducing heat in the said heating operation and in which at least part of the heat withdrawn during another cooling operation is transferred for use in a further heating operation by means of a second circulating heat carrier which is evaporated in withdrawing heat during the said another cooling operation and is condensed in introducing heat during the said further heating operation, each heat carrier being circulated in a separate closed circuit by a pump which deals with the carrier in the liquid state only and the two closed circuits being linked thermally so that the balance between the amount of heat withdrawn and the amount of heat introduced by the second circuit is made up by the evaporation of part of said first-mentioned heat carrier in indirect contact with condensing vapour of the said second heat carrier.

2. The process of claim 1 in which part of the vapour produced by the evaporation of said first-mentioned heat carrier is condensed in indirect contact with a refrigerating medium so as to balance the heat requirements of the system.

3. In the separation of mixed gases by cooling to successively lower temperatures in a number of heat exchangers, followed by fractionation in three fractionating towers connected in series and operated at successively lower relative pressures and at successively higher relative temperatures with the separation of gaseous fractions at the tops of the towers and liquid fractions at the bottoms thereof, the said liquid fractions in each case being passed into the next succeeding tower in said series, each of said towers being provided with a reflux condenser at the top and a reboiler at the bottom and wherein the temperature of the gaseous fraction condensing in the reflux condenser of the third tower in said series is higher than the temperature of the liquid fraction boiling in the reboiler of the first tower in said series, the improvement which comprises passing in a closed circuit a vaporizable liquid heat carrier as cooling fluid through the reflux condenser in said third tower under conditions producing vapourisation of said heat carrier, passing at least part of the resulting vapour as heating fluid through the reboiler of said first tower under conditions producing condensation of said vapour and returning the condensate thus produced to the reflux condenser of said third tower.

4. The process of claim 3 in which a portion of the liquid heat carrier is passed through one of said heat exchangers in indirect contact with the gas mixture to be separated, under conditions producing vapourisation of said liquid heat carrier.

5. The process of claim 4 in which the vapour of the heat carrier produced by evaporation in the reflux condenser of said third tower is mixed with that produced by evaporation in said heat exchanger and part only of the mixed vapour is passed into the reboiler of said first tower and condensed therein, the remaining part of the mixed vapour being condensed in indirect contact with a refrigerating medium so as to balance the heat requirements of the system.

6. The process of claim 4 in which a second vaporizable liquid heat carrier is passed in a second closed circuit as cooling fluid through another of said heat exchangers, which is earlier in the series of heat exchangers than said one of said heat exchangers, under conditions producing vapourisation of the heat carrier and at least part of the vapour so produced is passed as heating fluid through the reboiler of the second tower in said series under conditions producing condensation of the vapour.

7. In the process of separating mixed gases wherein the gases are compressed, cooled in at least one cooling zone by indirect contact with a cooling fluid and then fractionated in a series of fractionating towers operating at successively lower pressures and higher temperatures and equipped with cooling zones at their tops and heating zones at their bottoms, at least one of said cooling zones being operated at a temperature above one of said heating zones; the improvement which comprises establishing a supply of vaporizable liquid heat carrier, pumping the liquid in a closed system through one of said cooling zones in indirect contact with the gases undergoing separation under conditions causing vaporization of at least part of the liquid, passing the so-formed vapors at substantially the same order of pressure in indirect contact with the gases undergoing separation in one of the heating zones operating at a temperature below that of said cooling zone sufficient to cause at least part of the vapor to condense, and recycling the so-formed vaporizable liquid heat carrier; the differences in pressure throughout the said closed system being due substantially entirely to the mechanical resistance offered by the pipe lines.

8. The process of claim 7 wherein said cooling zone is the reflux condenser of one of the last fractionating columns in the series while the heating zone is the reboiler of one of the first columns of said series.

9. The process of claim 7 wherein part of the liquid heat carrier is pumped through at least one additional cooling zone connected in parallel with said first cooling zone and wherein the liquid is brought into indirect contact with the gases undergoing separation at temperatures sufficiently high to vaporize at least part of the liquid, the resulting vapors from the two zones then being united to be passed through said heating zone and there liquefied.

10. The process of claim 7 wherein part of the liquid heat carrier is pumped through a heat exchanger in indirect contact with a second refrigerating fluid operating in a second closed system in order to supply the cooling requirements for said second system, said heat exchanger being operated at a temperature sufficiently high to cause vaporization of at least part of the said liquid heat carrier and the so-formed vapors are united with those from the said cooling zone to be passed through said heating zone and there liquefied.

11. In a system of separating mixed gases into their components wherein the gases are compressed, cooled in a series of pre-cooling zones and then fractionated in a series of fractionating columns operating at successively lower pressures and higher temperatures and equipped with cooling zones at their tops operating at successively higher temperatures and heating zones at their bottoms operating at successively higher temperatures, the process of supplying cooling to said cooling zones and heat to said heating zones which comprises establishing and maintaining two independent but thermally interconnected closed systems in each of which a heat carrier liquid is circulated through one of said cooling zones in indirect contact with the gases to be separated operating at a temperature causing at least part of the heat carrier liquid to be vaporized and the so-formed vapors are then passed through one of said heating zones in indirect contact with said gases to be separated operating at a lower temperature than said cooling zone sufficient to cause at least part of the vapors to be condensed and the so-formed liquid heat carrier is then recycled, one of said closed systems being operated at a pressure and temperature lower than the second and both being operated at a substantially constant pressure, and passing part of the liquid heat carrier of the first closed system in indirect contact with part of the vapors of the second closed system to cause the liquid of the first system at least partly to vaporize and the vapors of the second system at least partly to liquefy, in order to balance the heat requirements of said second closed system.

12. The process of claim 11 wherein part of the liquid heat carrier of said first closed system is passed through the cooling zone at the top of one of said columns and wherein the resulting heat carrier vapors are then passed through the heating zone of a column preceding the first mentioned column, said heating zone being operated at a lower temperature than that of said cooling zone sufficient to cause condensation of at least part of said heat carrier vapors, and the so-formed liquid is then recycled.

13. The process of claim 11 wherein part of the liquid heat carrier of said second closed system is passed through one of said pre-cooling zones and the so-formed heat carrier vapors are then passed through the heating zone of one of said columns operating at a lower temperature than that of said pre-cooling zone sufficient to liquefy at least part of said vapors, and the so-formed liquid is then recycled.

14. The process of claim 11 wherein part of the liquid heat carrier of said first closed system is passed through one of said pre-cooling zones and the so-formed heat carrier vapors are then passed through the heating zone of one of said columns operating at a lower temperature than that of said pre-cooling zone sufficient to cause liquefaction of at least part of said vapors, and the so-formed liquid is then recycled.

15. Apparatus for the separation of mixed gases at low temperatures comprising a number of heat exchangers and a number of fractionating towers connected in series, a closed heat carrier circuit associated therewith in which a heat carrier is circulated by a pump dealing with the carrier in the liquid state only and which circuit serves to withdraw heat from one part of the gas separation apparatus by evaporation of carrier in the liquid state and to introduce heat in another part by condensation of carrier in the vapor state; said apparatus having associated therewith a second closed heat carrier circuit in which a second heat carrier is circulated by a pump dealing with the carrier in the liquid state only and which second circuit serves to withdraw heat from another part of the gas separation apparatus by evaporation of said second carrier in the liquid state and to introduce heat in a still further part by condensation of the second carrier in the vapor state.

16. The apparatus of claim 15 wherein the two carrier circuits are linked thermally so that the balance between the amount of heat to be introduced by the second circuit may be made up by evaporation of part of said first mentioned heat carrier in indirect contact with condensing vapor of said second heat carrier.

17. Apparatus for the separation of mixed gases at low temperatures comprising a number of heat exchangers and a number of fractionating towers connected in series and a closed heat carrier circuit associated therewith in which a heat carrier is circulated by a pump dealing with the carrier in the liquid state only, said circuit serving to withdraw heat in one part of the gas separation apparatus by evaporation of carrier in the liquid state and to introduce heat in another part by condensation of carrier in the vapor state, and said circuit being linked thermally with a refrigerating machine in such a way that any excess in the amount of heat required to be withdrawn over the amount of heat required to be introduced by means of the said carrier circuit is made up by cold produced by the refrigerating machine and transferred to the carrier.

ALFRED AUGUST AICHER.

REFERENCES CITED

The following references are of record in the file of this patent:

UNITED STATES PATENTS

| Number | Name | Date |
| --- | --- | --- |
| 1,853,743 | Pollitzer | Apr. 12, 1932 |
| 2,127,004 | Nelson | Aug. 16, 1938 |
| 2,284,662 | Kahle | June 2, 1942 |
| 2,355,660 | Le Rouge | Aug. 15, 1944 |
| 2,423,273 | Van Nuys | July 1, 1947 |
| 2,500,353 | Gantt | Mar. 14, 1950 |

FOREIGN PATENTS

| Number | Country | Date |
| --- | --- | --- |
| 876,651 | France | Nov. 12, 1942 |
| 878,490 | France | Jan. 21, 1943 |